(12) United States Patent
Kimmich

(10) Patent No.: US 11,305,359 B2
(45) Date of Patent: Apr. 19, 2022

(54) DEVICE FOR SECURING A BORING BAR

(71) Applicant: Hubert Kimmich, Schramberg (DE)

(72) Inventor: Hubert Kimmich, Schramberg (DE)

(*) Notice: Subject to any disclaimer, the term of this patent is extended or adjusted under 35 U.S.C. 154(b) by 0 days.

(21) Appl. No.: 16/642,902

(22) PCT Filed: Aug. 2, 2019

(86) PCT No.: PCT/EP2019/000236
§ 371 (c)(1),
(2) Date: Feb. 28, 2020

(87) PCT Pub. No.: WO2020/011394
PCT Pub. Date: Jan. 16, 2020

(65) Prior Publication Data
US 2021/0379672 A1    Dec. 9, 2021

(30) Foreign Application Priority Data
Feb. 26, 2019   (DE) .................... 10 2019 001 347.6

(51) Int. Cl.
*B23B 29/02* (2006.01)
*B23B 31/107* (2006.01)

(52) U.S. Cl.
CPC .......... *B23B 29/02* (2013.01); *B23B 31/1075* (2013.01); *B23B 29/022* (2013.01)

(58) Field of Classification Search
CPC ....... B23B 29/02; B23B 29/022; B23B 29/04; B23B 31/1075
See application file for complete search history.

(56) References Cited

U.S. PATENT DOCUMENTS

| 3,961,857 A * | 6/1976 | Koblesky ................ B23B 29/02 408/83 |
| 5,156,503 A | 10/1992 | Tsujimura et al. |
| 7,396,196 B2 * | 7/2008 | Oettle .................... B23B 29/02 407/110 |
| 2007/0101839 A1 | 5/2007 | Travez et al. |
| 2008/0179839 A1 | 7/2008 | Walters |
| 2008/0247832 A1 | 10/2008 | Maier et al. |

(Continued)

FOREIGN PATENT DOCUMENTS

| CN | 102151859 B | 2/2013 |
| DE | 26 48 753 A1 | 5/1978 |

(Continued)

*Primary Examiner* — Eric A. Gates
(74) *Attorney, Agent, or Firm* — Norman B. Thot (57) ABSTRACT

A fixing device for fixing a boring bar on a material-removing machine includes a reducing sleeve with a hollow profile arranged on a front face which faces away from a machine chuck. The boring bar is received in an interior of the hollow profile. An end region of the boring bar projects from the hollow profile and carries a cutting tool. The hollow profile has a wall arranged between the interior and an exterior of the hollow profile. The wall has a first thickness and a second thickness. The first thickness is less than the second thickness. The first thickness is established at a side of the fixing device where the cutting tool projects radially from the boring bar. A longitudinal axis of the hollow profile is parallel to and at a distance from the axis of the reducing sleeve which is coaxial with the interior of the boring bar.

18 Claims, 5 Drawing Sheets

(56) References Cited

U.S. PATENT DOCUMENTS

| | | | |
|---|---|---|---|
| 2010/0322722 A1* | 12/2010 | Lin | B23B 29/046 407/11 |
| 2016/0199918 A1 | 7/2016 | Langbein et al. | |
| 2016/0236282 A1 | 8/2016 | Kitagawa | |

FOREIGN PATENT DOCUMENTS

| | | | |
|---|---|---|---|
| DE | 27 13 529 A1 | 9/1978 | |
| DE | 39 30 124 A1 | 4/1990 | |
| DE | 197 13 815 A1 | 10/1997 | |
| DE | 200 10 789 U1 | 8/2000 | |
| DE | 20 2013 008 019 U1 | 11/2013 | |
| DE | 102015104057 A1 * | 9/2016 | B23B 29/02 |
| DE | 202017005713 U1 * | 1/2018 | B23B 29/04 |
| GB | 256153 A | 8/1926 | |
| JP | 3151632 U | 7/2009 | |

\* cited by examiner

DEVICE FOR SECURING A BORING BAR

CROSS REFERENCE TO PRIOR APPLICATIONS

This application is a U.S. National Phase application under 35 U.S.C. § 371 of International Application No. PCT/EP2019/000236, filed on Aug. 2, 2019 and which claims benefit to German Patent Application No. 10 2019 001 347.6, filed on Feb. 26, 2019. The International Application was published in German on Jan. 16, 2020 as WO 2020/011394 A1 under PCT Article 21(2).

FIELD

The present invention relates to a device for fixing a boring bar on a material-removing machine, the device having a cylindrical reducing sleeve that can be fixed in the machine chuck and on the front end of which, facing away from the machine chuck, a hollow profile projects, of which the in particular cylindrical interior, coaxial with the axis of the reducing sleeve, receives the boring bar, wherein an end region of the boring bar, projecting from the hollow profile, carries a cutting tool.

BACKGROUND

Such a device is described in JP 3 151 632 U. It has here been demonstrated that insufficient clearance exists between the cavity inner wall and the outer wall of the hollow profile when boring cylindrical cavities so that deep and narrow cavities cannot be bored without being able to prevent a collision of the hollow profile with the cavity.

SUMMARY

An aspect of the present invention to improve on a device of the type mentioned above so that the boring bar can also penetrate into narrow and deeper bores as a result of an improved higher rigidity so that better machining results and shorter machining times can be achieved.

In an embodiment, the present invention provides a fixing device for fixing a boring bar on a material-removing machine. The fixing device includes a cylindrical reducing sleeve configured to be fixed in a machine chuck. The cylindrical reducing sleeve comprises a hollow profile which is arranged on a front face of the cylindrical reducing sleeve which faces away from the machine chuck. The hollow profile comprises an interior which is coaxial with an axis of the cylindrical reducing sleeve. The boring bar is configured to be received in the interior of the hollow profile. The boring bar comprises an end region which is arranged to project from the hollow profile and to carry a cutting tool. The hollow profile further comprises a wall which is configured to stabilize the boring bar, the wall being arranged between the interior of the hollow profile and an exterior of the hollow profile. The wall comprises a first thickness and at least a second thickness. The first thickness is established at a side of the fixing device where the cutting tool projects radially from the boring bar. The first thickness is less than the second thickness. A longitudinal axis of the hollow profile is arranged to be axially parallel to and at a distance from the axis of the cylindrical reducing sleeve which is coaxial with the interior of the boring bar.

BRIEF DESCRIPTION OF THE DRAWINGS

The present invention is described in greater detail below on the basis of embodiments and of the drawings in which.

DETAILED DESCRIPTION

The present invention provides that the wall of the hollow profile stabilizing the boring bar, located between the interior of the hollow profile and the hollow profile outer wall, has a lower thickness in the device lateral region, in which the cutting tool projects from the boring bar, than the thickness of the remaining wall of the hollow profile, wherein the longitudinal axis of the hollow profile is located axially parallel to and at a distance from the common axis of the reducing sleeve and the boring bar.

An enlarged clearance exists between the tool cutter and the hollow profile stabilizing the boring bar, so that the hollow profile can follow the cutting tool into the bore without any collision.

The following advantages can be achieved by the device according to the present invention:

- As a result of the increase in the stability of the boring bar, higher feed rates, advance rates, and cutting speeds can be achieved, which accordingly shortens the machining time.
- As a result of reducing vibrations, better surface qualities are achieved. The production of "chatter marks" by vibrations is extremely minimized.
- As a result of lower vibrations, the service life of the tools is increased, which reduces tool costs.
- Considerably better and more economical results are achieved even with simple and more inexpensive boring bars.
- For the production of a larger and/or deeper bore, it is also possible for a smaller (thinner) and/or shorter more inexpensive boring bar to be used in the boring bar stabilizer. The multiplicity of tools can thus be reduced, which in turn results in a cost reduction.
- The use of internally cooled boring bars is not absolutely necessary since the cooling can be carried out directly to the machining cutter via the lateral surfaces of the boring bar in conjunction with the boring bar stabilizer.
- The boring bar gauge length can be adjusted variably, which means that even smaller diameters can be machined with the boring bar.
- With a smaller, thinner boring bar, even larger and deeper diameters can be bored without difficulty, which, without the boring bar stabilizer, would normally result in inadequate results and machining times. This in turn results in shorter changeover times and thus provides additional savings.
- As a result of its high stability, the tool can also be used in roughing and/or finishing machining operations for internal and also for external machining. This eliminates a tool change in multi-axis machines, for example, from an internal to an external machining tool. These represent additional savings in time and costs as a result of eliminated downtimes and lower tool costs on the machining machines.

It is, for example, proposed that the outer wall of the stabilizing hollow profile be cylindrical with a circular or oval cross section. The outer wall of the stabilizing hollow profile can also have a cross section with optional flattened regions.

A sufficient clearance between the bore inner wall and the outer side of the hollow profile is achieved if, in the region of its lowest thickness, the hollow profile wall has a thickness of ½ to 1/30 of the thickness of the hollow profile wall in the region of its greatest thickness.

The stabilizing hollow profile can be inserted and fixed, in particular length-adjustably, in a longitudinal recess of the reducing sleeve. The stabilizing hollow profile can, for example, be integrally molded on the front face of the reducing sleeve.

The aforementioned advantages are in particular provided when the distance of the axis of the stabilizing hollow profile from the axis of the reducing sleeve and the boring bar is 1/10 to 1/30, for example, ¼ to ¾, of the diameter of the boring bar.

In an embodiment of the present invention, on the side or in the region of the device on which the cutting tool projects, the covering wall of the hollow profile can, for example, have a lower thickness D1 than the thickness D2 of the hollow profile wall in the remaining sides/regions.

In an embodiment of the present invention in which the hollow profile is missing, the outer wall of the boring bar can, for example, be cylindrical with the boring bar axis of rotation as a cylinder axis, apart from a flattened region of the boring bar outer wall, at the end of which the cutting tool projects from the boring bar and which is located between the reducing sleeve and the cutting tool, so that in the flattened region, the boring bar outer wall has a smaller radius than the radius of the remaining cylindrical boring bar outer wall. The radius of the boring bar in the flattened region is here, for example, ½ to 9/10 of the radius of the remaining cylindrical boring bar outer wall.

In an embodiment of the present invention, it is an important feature that the boring bar can, for example, be inserted off-center in a clamping sleeve or a reducing sleeve, which has the same axis of rotation as the boring bar.

The stability of the boring bar is increased substantially if the cross-sectional area of the boring bar in the region remote from the cutting tool is greater than in the region closer to the cutting tool, so that the cross-sectional area decreases from the clamping point to the cutting tool. The reduction in the cross-sectional area of the boring bar can in this case be made stepwise.

Exemplary embodiments of the present invention are illustrated in the drawings and will be described in greater detail below.

The device 1 according to the present invention for fixing a boring bar 3 on a material-removing machine (the machine is not illustrated in the drawings) has a reducing sleeve (clamping sleeve) 2, which has a cylindrical outer shell 2a, with which it can be fixed in a cylindrical recess in the machine chuck. The reducing sleeve 2 has an optional flange 2b at the outer end. The reducing sleeve 2 also has an internal longitudinal recess 2c into which the boring bar 3 is longitudinally displaceably inserted with a form fit, the outer wall 3a of which is cylindrical, so that the longitudinal recess 2c of the reducing sleeve 2 is also cylindrical with the same diameter D. The reducing sleeve 2, the boring bar 3 and a cylindrical longitudinal recess 5a of the hollow profile 5 therefore have the same longitudinal axis L2.

Figure 1:
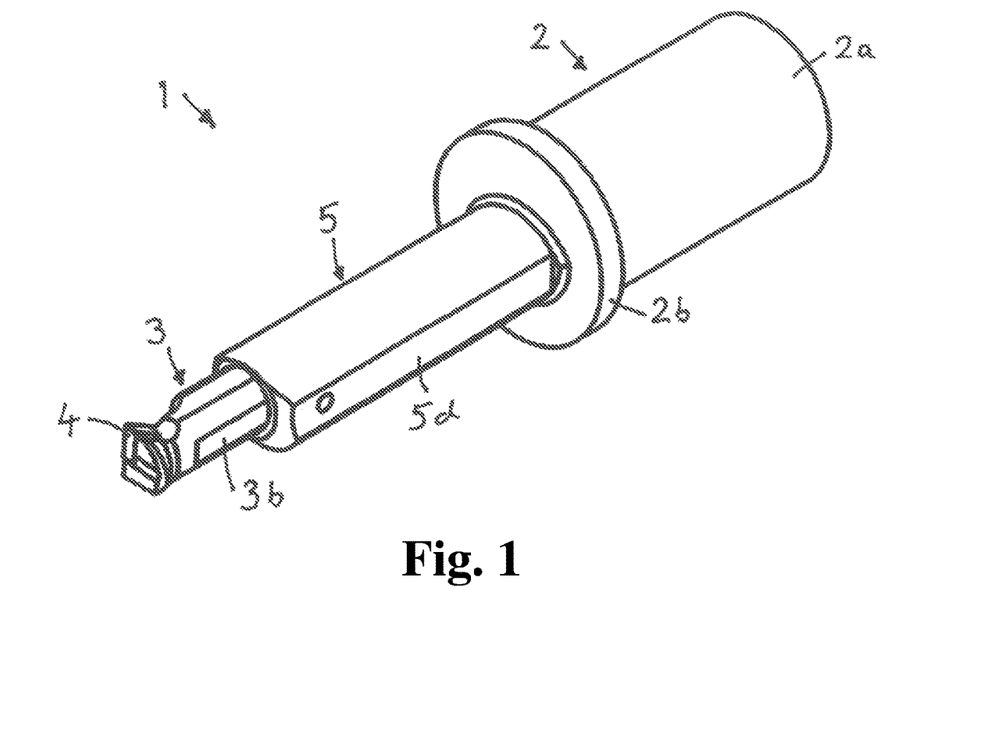
FIG. 1 shows a perspective view of a reducing sleeve, a hollow profile, and a boring bar.
Figure 2:
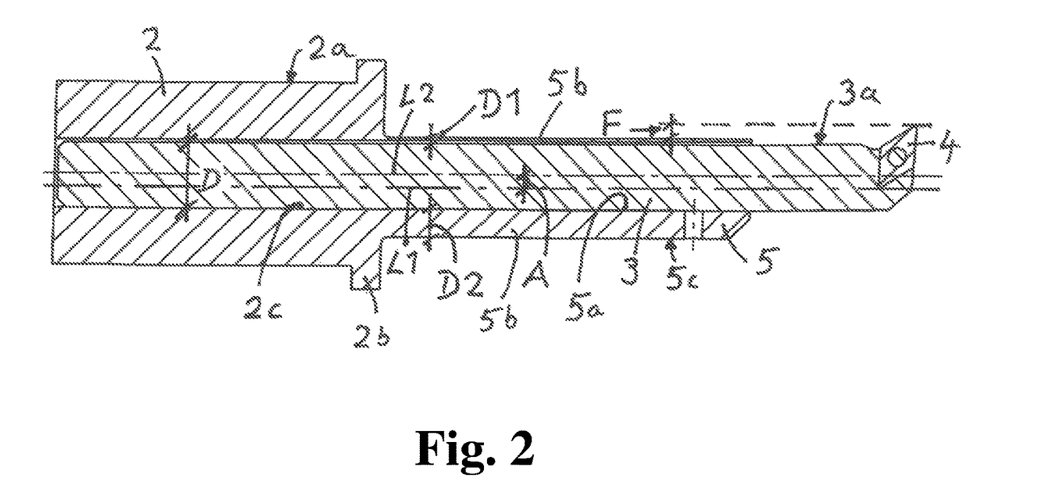
FIG. 2 shows an axial perpendicular section through the reducing sleeve with an integrally molded stabilizing hollow profile and an inserted boring bar.
Figure 3:
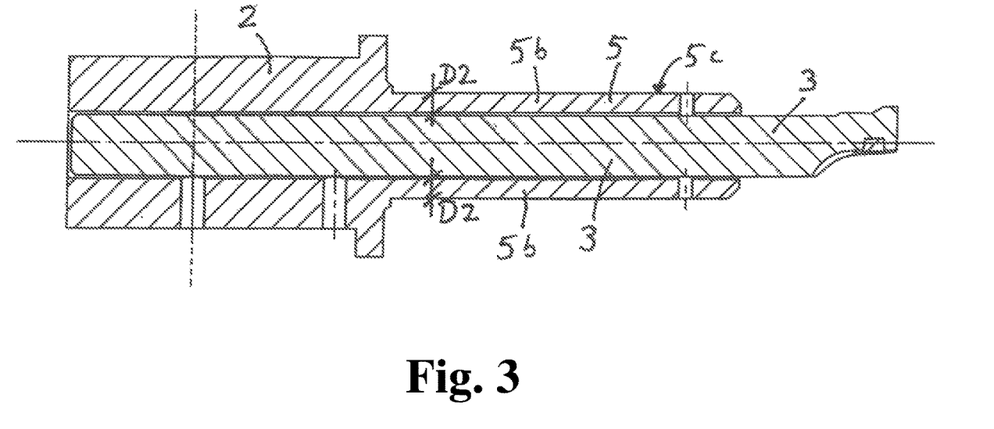
FIG. 3 shows an axial horizontal section through the reducing sleeve with an integrally molded stabilizing hollow profile and an inserted boring bar.
Figure 4:
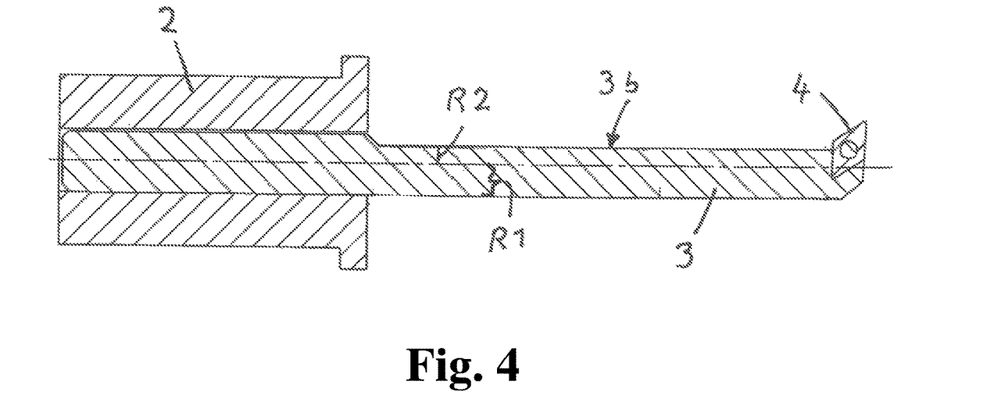
FIG. 4 shows an axial perpendicular section through a second embodiment without a hollow profile.
Figure 5:
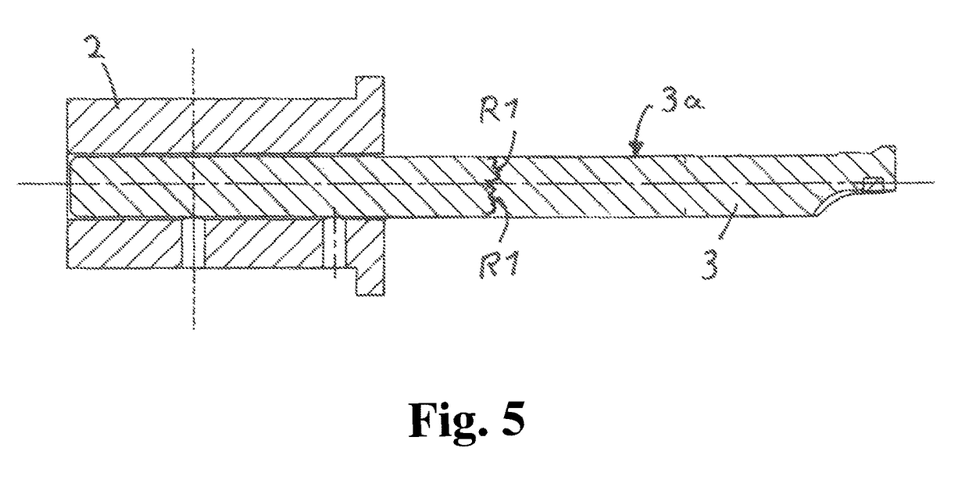
FIG. 5 shows an axial horizontal section through the second embodiment without the hollow profile.

In the exemplary embodiment shown in FIGS. 1 to 3, the outer wall 3a of the boring bar 3 has optional longitudinally directed flattened regions 3b. A cutting tool 4 is interchangeably fixed to the front end of the boring bar 3.

A hollow profile 5 is integrally molded on the front end of the reducing sleeve 2 as a boring bar stabilizer, the hollow profile having a cylindrical longitudinal recess 5a into which the boring bar 3 is longitudinally adjustably inserted with a form fit so that the cylindrical longitudinal recess 5a is aligned with the longitudinal recess 2c of the reducing sleeve and has the same longitudinal axis L2.

The hollow profile 5 stabilizing the boring bar 3 covers the boring bar 3 with its entire length, wherein, on the side or in the region of the device on/in which the cutting tool 4 projects, the covering wall 5b of the hollow profile has a thickness D1 which is less than the thickness D2 of the hollow profile covering wall 5b on/in the remaining sides/regions 5c. The longitudinal axis L1 of the hollow profile 5 is thus located parallel to and at a distance A from the longitudinal axis L2 of the cylindrical longitudinal recess 5a of the hollow profile 5. The remaining sides/regions 5c of the hollow profile 5 can optionally be provided with one or more flattened regions 5d, one of which is shown in FIG. 1.

As shown in FIG. 2, a clearance F is thus produced between the tool cutter and the outer wall of the hollow profile 5. This makes it possible for the hollow profile 5, as a boring bar stabilizer, to be able to follow the tool cutter into the bore without colliding with the workpiece.

In a non-illustrated embodiment of the present invention, the hollow profile 5 is not integrally molded on the reducing sleeve 2, but is instead inserted into a recess, in particular into a bore, in the reducing sleeve with a form fit, so that the inner contour of the recess/bore of the reducing sleeve 2 corresponds to the outer contour of the hollow profile 5.

The boring bar 3 is clamped firmly in the hollow profile 5 and in the reducing sleeve 2 by screws (the bores of which are shown in FIG. 3). In the embodiment with a hollow profile inserted into the reducing sleeve, the hollow profile is also clamped firmly in the reducing sleeve by screws. The clamping and/or fixing can also be performed by other methods, for example, by shrinking the boring bar 3 in.

FIGS. 4 to 7 illustrate embodiments in which the hollow profile 5 stabilizing the boring bar 3 is missing. The boring bar inserted coaxially into the reducing sleeve 2 is instead designed to be sufficiently stable, as is in particular shown by FIGS. 6 and 7. The boring bar 3 can here have a region 3c with a particularly large cross section which is located further away from the cutting tool 4. Close to the cutting tool 4, the boring bar has a region 3d having a smaller cross section so that it remains possible to still work in smaller openings/bores. The transition from a large to a smaller cross section can, for example, occur via one or more steps.

While the hollow profile 5 acts as a boring bar stabilizer and has a flattened region in the embodiment shown in to FIGS. 1 to 3, in the embodiments shown in FIGS. 4 to 7, the hollow profile 5 is missing and the boring bar 3 is itself flattened with its flattened boring bar outer wall (flattened region 3b), with the same advantages as recited above in relation to the flattened region of the hollow profile 5.

The outer shell 3a of the boring bar 3 is cylindrical with the axis of rotation of boring bar 3 as a cylinder axis, apart from the flattened region 3b of the boring bar outer wall 3a, at the end of which the cutting tool 4 projects from the boring bar 3 and which is located between the reducing sleeve 2 and the cutting tool 4 so that, in the flattened region 3b, the boring bar outer wall 3a has a smaller radius R2 than the radius R1 of the remaining cylindrical boring bar outer wall 3a. The radius R2 of the boring bar 3 in the flattened region 3b is ½ to 9/10 of the radius R1 of the remaining cylindrical boring bar outer wall 3a.

Figure 6:
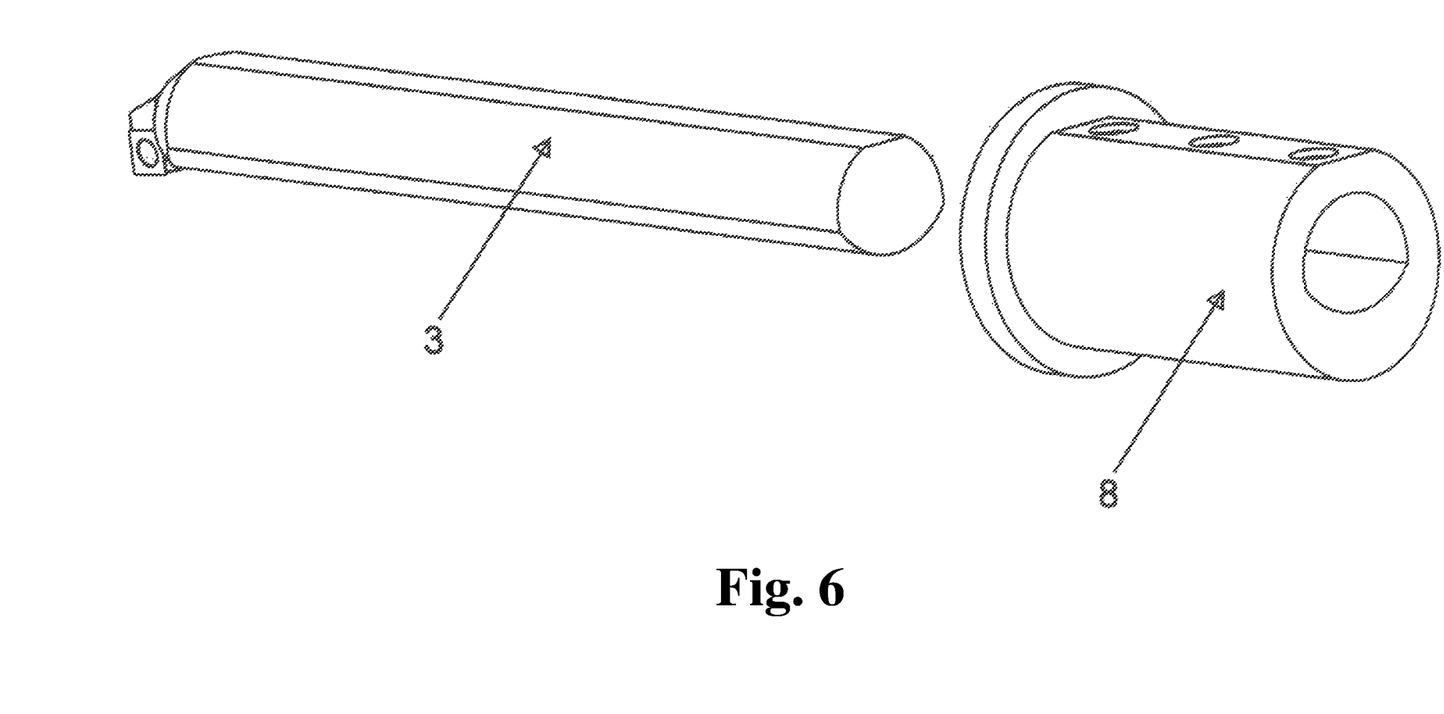
FIG. 6 shows a perspective view of a third embodiment with a clamping sleeve.
Figure 7:
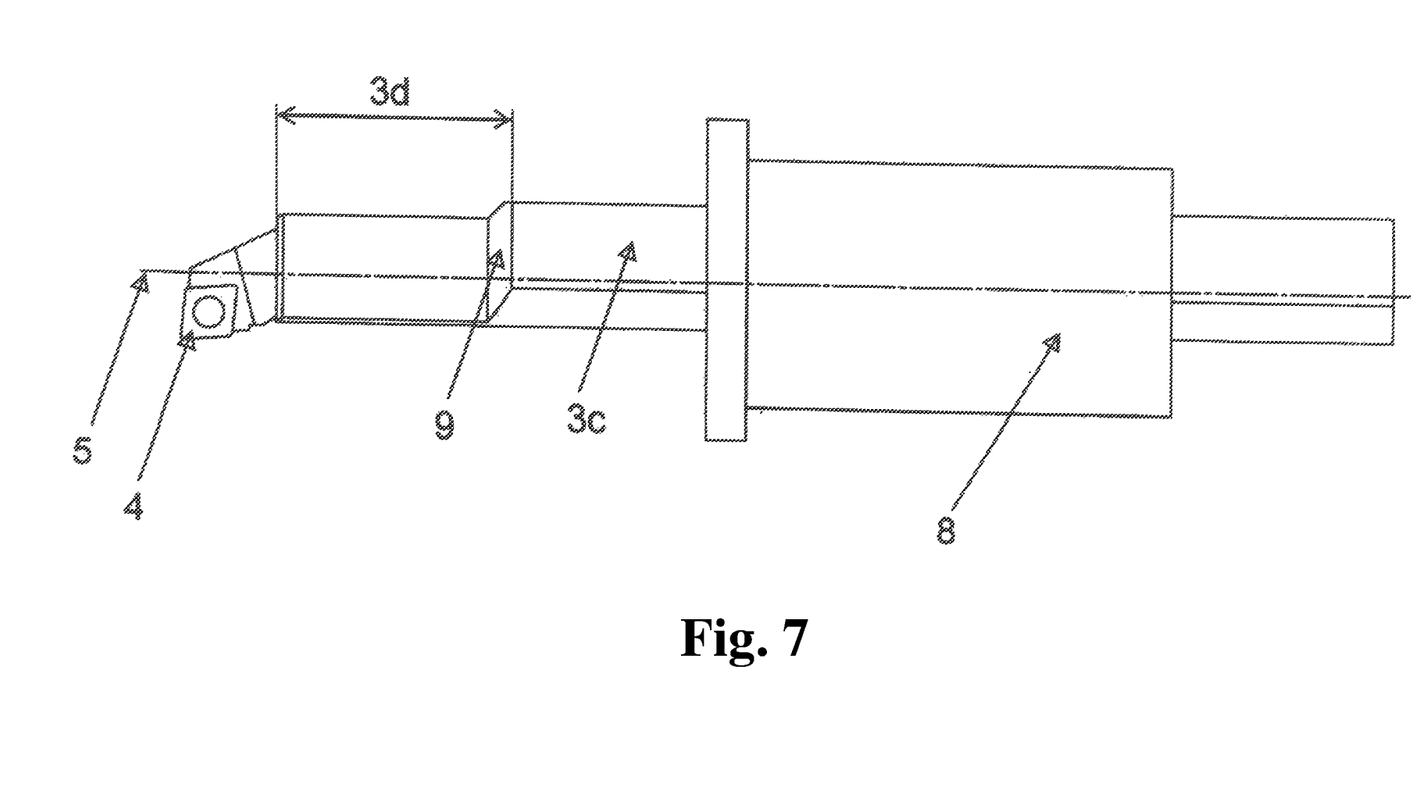
FIG. 7 shows a perspective view of a fourth embodiment with a clamping sleeve and a stepped boring bar.

In the embodiments shown in FIGS. 6 and 7, the hollow profile 5 is also missing as a boring bar stabilizer, and the boring bar 3 again has a flattened region as a result of the flattened region 3b of the boring bar outer wall.

The boring bar 3 is inserted off-center in a clamping sleeve 8 or a reducing sleeve, which has the same axis of rotation as the boring bar 3. The cross-sectional area of the boring bar 3 here decreases from its clamping point to the cutting tool 4. The reduction in the cross-sectional area of the boring bar 3 can, for example, here occur stepwise, i.e., see step 9.

The present invention is not limited to embodiments described herein; reference should be had to the appended claims.

What is claimed is:

1. A fixing device for fixing a boring bar on a material-removing machine, the fixing device comprising:
a cylindrical reducing sleeve configured to be fixed in a machine chuck, the cylindrical reducing sleeve comprising a longitudinal recess and a hollow profile which is arranged on a front face of the cylindrical reducing sleeve which faces away from the machine chuck, the hollow profile comprising an interior which is coaxial with an axis of the cylindrical reducing sleeve,
wherein,
the boring bar is configured to be received in the interior of the hollow profile, the boring bar comprising an end region which is arranged to project from the hollow profile and to carry a cutting tool,
the hollow profile further comprises a wall which is configured to stabilize the boring bar, the wall being arranged between the interior of the hollow profile and an exterior of the hollow profile, the wall comprising a first thickness and at least a second thickness, the first thickness being less than the second thickness, wherein the first thickness is established at a side of the fixing device where the cutting tool projects radially from the boring bar,
a longitudinal axis of the hollow profile is arranged to be axially parallel to and at a distance from the axis of the cylindrical reducing sleeve which is coaxial with the boring bar, and
the hollow profile is inserted and fixed in the longitudinal recess of the cylindrical reducing sleeve.

2. The fixing device as recited in claim 1, wherein the interior of the hollow profile is cylindrical.

3. The fixing device as recited in claim 1, wherein the exterior of the hollow profile is configured to be cylindrical with a circular cross section or with an oval cross section.

4. The fixing device as recited in claim 1, wherein hollow profile outer wall has a cross section having at least one flattened region.

5. The fixing device as recited in claim 1, wherein the first thickness is ½ to 1/30 of the second thickness.

6. The fixing device as recited in claim 1, wherein the hollow profile is integrally molded on the front face of the cylindrical reducing sleeve.

7. The fixing device as recited in claim 1, wherein the hollow profile is inserted and fixed in the longitudinal recess of the cylindrical reducing sleeve so as to be length adjustable.

8. The fixing device as recited in claim 1, wherein,
the boring bar further comprises a diameter, and
a distance of the longitudinal axis of the hollow profile from the axis of the cylindrical reducing sleeve which is coaxial with the boring bar is 1/10 to 1/30 of the diameter of the boring bar.

9. The fixing device as recited in claim 8, wherein the distance of the longitudinal axis of the hollow profile from the axis of the cylindrical reducing sleeve which is coaxial with the boring bar is ¼ to ¾ of the diameter of the boring bar.

10. The fixing device as recited in claim 1, wherein, on a side or in a region of the fixing device from which the cutting tool projects, the wall of the hollow profile has a thickness which is less than a thickness of the wall in remaining sides/regions.

11. A fixing device for fixing a boring bar on a material-removing machine, the fixing device comprising:
a reducing sleeve which is fixed in a machine chuck, the reducing sleeve comprising a longitudinal recess and a hollow profile which is arranged on a front face of the reducing sleeve which faces away from the machine chuck, the hollow profile comprising an interior which is coaxial with an axis of the reducing sleeve,
wherein,
the hollow profile is inserted and fixed in the longitudinal recess of the reducing sleeve,
the boring bar projects axially along the axis of the reducing sleeve at a front end which faces away from the machine chuck,
the machine chuck and the boring bar rotate about a same axis of rotation,
the boring bar comprises an outer projecting end region which is configured to carry a cutting tool, and an outer wall which comprises a cylindrical boring bar outer wall and a flattened outer wall region, and
the cylindrical boring bar outer wall is cylindrical with a boring bar axis of rotation as a cylinder axis with the exception of the flattened outer wall region of the outer wall, the cutting tool projecting from the boring bar at an end of the flattened outer wall region and the flattened outer wall region being arranged between the reducing sleeve and the cutting tool so that, in the flattened outer wall region, the outer wall has a first radius which is less than a second radius of the outer wall at the cylindrical boring bar outer wall.

12. The fixing device as recited in claim 11, wherein the first radius of the boring bar in the flattened outer wall region of the outer wall is ½ to 9/10 of the second radius of the cylindrical boring bar outer wall of the outer wall.

13. The fixing device as recited in claim 11, wherein, the reducing sleeve has the same axis of rotation as the boring bar, and the boring bar is inserted off-center in the clamping sleeve.

14. The fixing device as recited in claim 11, wherein,
the reducing sleeve further comprises a same axis of rotation as the boring bar, and
wherein,
the boring bar is inserted off-center in the reducing sleeve.

15. The fixing device as recited in claim 11, wherein a cross-sectional area of the boring bar in a region remote from the cutting tool is greater than in a region closer to the cutting tool so that a reduction of the cross-sectional area decreases from a clamping point to the cutting tool.

16. The fixing device as recited in claim 15, wherein the reduction in the cross-sectional area of the boring bar occurs stepwise.

17. A system for removing material, the system comprising:
- a material-removing machine comprising a machine chuck;
- a boring bar; and
- a fixing device for fixing the boring bar on the material-removing machine, the fixing device comprising a cylindrical reducing sleeve which is configured to be fixed in the machine chuck of the material-removing machine, the cylindrical reducing sleeve comprising a longitudinal recess and a hollow profile which is arranged on a front face of the cylindrical reducing sleeve which faces away from the machine chuck, the hollow profile comprising an interior which is coaxial with an axis of the cylindrical reducing sleeve, wherein,
the boring bar is configured to be received in the interior of the hollow profile, the boring bar comprising an end region which is arranged to project from the hollow profile and to carry a cutting tool,
the hollow profile further comprises a wall which is configured to stabilize the boring bar, the wall being arranged between the interior of the hollow profile and an exterior of the hollow profile, the wall comprising a first thickness and at least a second thickness the first thickness being less than the second thickness, wherein the first thickness is established at a side of the fixing device where the cutting tool projects radially from the boring bar,
a longitudinal axis of the hollow profile is arranged to be axially parallel to and at a distance from the axis of the cylindrical reducing sleeve which is coaxial with the boring bar, and
the hollow profile is inserted and fixed in the longitudinal recess of the cylindrical reducing sleeve.

18. A fixing device for fixing a boring bar on a material-removing machine, the fixing device comprising:
- a cylindrical reducing sleeve configured to be fixed in a machine chuck, the cylindrical reducing sleeve comprising a hollow profile which is arranged on a front face of the cylindrical reducing sleeve which faces away from the machine chuck, the hollow profile comprising an interior which is coaxial with an axis of the cylindrical reducing sleeve, wherein,
the boring bar is configured to be received in the interior of the hollow profile, the boring bar comprising an end region which is arranged to project from the hollow profile and to carry a cutting tool,
the hollow profile further comprises a wall which is configured to stabilize the boring bar, the wall being arranged between the interior of the hollow profile and an exterior of the hollow profile, the wall comprising a first thickness and at least a second thickness, the first thickness being $\frac{1}{2}$ to $\frac{1}{30}$ of the second thickness, wherein the first thickness is established at a side of the fixing device where the cutting tool projects radially from the boring bar, and
a longitudinal axis of the hollow profile is arranged to be axially parallel to and at a distance from the axis of the cylindrical reducing sleeve which is coaxial with the interior of the boring bar.

* * * * *